United States Patent [19]

Bercovitz et al.

[11] Patent Number: 4,922,109
[45] Date of Patent: May 1, 1990

[54] DEVICE FOR RECOGNIZING AUTHENTIC DOCUMENTS USING OPTICAL MODULAS

[75] Inventors: Christian Bercovitz, Bonne, France; Alexandre Feyjoo, Avanchet-parc, Switzerland

[73] Assignee: LGZ Landis & Gyr Zug AG, Zug, Switzerland

[21] Appl. No.: 339,249

[22] Filed: Apr. 14, 1989

[30] Foreign Application Priority Data

Apr. 18, 1988 [CH] Switzerland ............... 1413/88

[51] Int. Cl.$^5$ ............... G06K 5/00; G06K 9/74
[52] U.S. Cl. ............... 250/556; 356/71; 250/227.11; 235/473
[58] Field of Search ........... 250/208, 209, 226, 227, 250/223 R, 556, 578; 356/71, 444

[56] References Cited

U.S. PATENT DOCUMENTS

| | | | |
|---|---|---|---|
| 3,426,324 | 2/1969 | Manly | 340/173 |
| 3,761,876 | 9/1973 | Flaherty et al. | 340/146.3 |
| 3,872,434 | 3/1975 | Duvall et al. | 340/146.3 |
| 3,916,194 | 10/1975 | Novak et al. | 250/556 |
| 4,146,792 | 3/1979 | Stenzel et al. | 356/71 |
| 4,298,807 | 11/1981 | Favre | 250/562 |
| 4,319,137 | 3/1982 | Nakamura et al. | 250/556 |
| 4,501,439 | 2/1985 | Antes | 356/71 |
| 4,542,829 | 9/1985 | Emery et al. | 356/71 |
| 4,544,266 | 10/1985 | Antes | 356/71 |
| 4,587,434 | 5/1986 | Roes et al. | 356/71 |
| 4,618,257 | 10/1986 | Bayne et al. | 356/71 |
| 4,645,936 | 2/1987 | Gorgone | 356/71 |
| 4,647,766 | 3/1987 | Dimur | 250/227 |
| 4,650,320 | 3/1987 | Chapman et al. | 356/71 |

FOREIGN PATENT DOCUMENTS

| | | |
|---|---|---|
| 0125060 | 11/1984 | European Pat. Off. . |
| 0072236 | 7/1987 | European Pat. Off. . |
| 3040963 | 5/1981 | Fed. Rep. of Germany . |
| 3301494 | 7/1984 | Fed. Rep. of Germany . |
| 3239995 | 7/1985 | Fed. Rep. of Germany . |
| 3705870 | 12/1987 | Fed. Rep. of Germany . |
| 2760165 | 6/1988 | Fed. Rep. of Germany . |
| 1470737 | 4/1977 | United Kingdom . |

Primary Examiner—David C. Nelms
Assistant Examiner—Stephone B. Allen
Attorney, Agent, or Firm—Marmorek, Guttman & Rubenstein

[57] ABSTRACT

A recognition device for authenticating documents is disclosed. The recognition device comprises a reading head for optically scanning the documents. The reading head includes at least two modules of substantially identical construction, each of which is provided with a line of photosensors. The reading head also includes means for determining the spectral sensitivity of the modules. The recognition device also includes a conveying system for providing relative movement between the reading head and the documents being scanned. An evaluation means correlates signals provided by the photosensors with prestored values to control a sorter which sorts the documents based on their authenticity or falsehood.

11 Claims, 1 Drawing Sheet

DEVICE FOR RECOGNIZING AUTHENTIC DOCUMENTS USING OPTICAL MODULAS

FIELD OF THE INVENTION

The present invention relates to a device for recognizing the authenticity of documents. The invention is particularly useful with bank note accepting machines.

BACKGROUND OF THE INVENTION

Devices for the automatic recognition of authentic and forged documents measure light reflected by the documents or light transmitted through the documents by means of a predetermined number of photo-elements, whereby the documents are optically scanned only in individual predetermined points or in a determined grid of points. The documents are also illuminated by means of spectrally narrow light sources in order to recognize mechanically color differences at the surface of the documents, e.g. those of imprinted patterns (Great Britain Pat. Document 1,470,737).

A device known through DE-OS (German application) 29 47 958 is provided with a replaceable reading head which is equipped with a line-like arrangement of the photo elements and a linear illumination device attached on one side and integrated into the reading head, whereby white light is transmitted from a source outside the reading head by means of a light conducting bundle.

U.S. Pat. 3,872,434 shows an arrangement for the transformation of analog signals corresponding to a number of photo-elements utilizing a multiplexer and only one digital to analog converter. DE-OS (German application) 30 40 963 describes the evaluation of converted digital signals, the comparison with stored values and the identification of the document as well as the production of a signal for the control of a document sorting and conveying device.

It is the object of the instant invention to create a device for recognizing authentic documents with a reading head that is easily adaptable to the documents to be examined, and characterized by low cost, simple construction and which is easy to repair.

SUMMARY OF THE INVENTION

The present invention is a recognition device for authenticating documents. The recognition device comprises a reading head for scanning documents. The reading head includes at least two modules of substantially identical construction, each of which is provided with a line of photosensors. The reading head also includes means for determining the spectral sensitivity of the modules.

The recognition device also includes a conveying system for providing relative movement between the reading head and the documents being scanned. An evaluation means correlates signals provided by the photosensors with prestored values to control a sorter which sorts the documents based on their authenticity or falsehood. The modular construction of the reading head is a particular advantage of the inventive document recognition device.

DETAILED DESCRIPTION OF THE INVENTION

Figure 1:
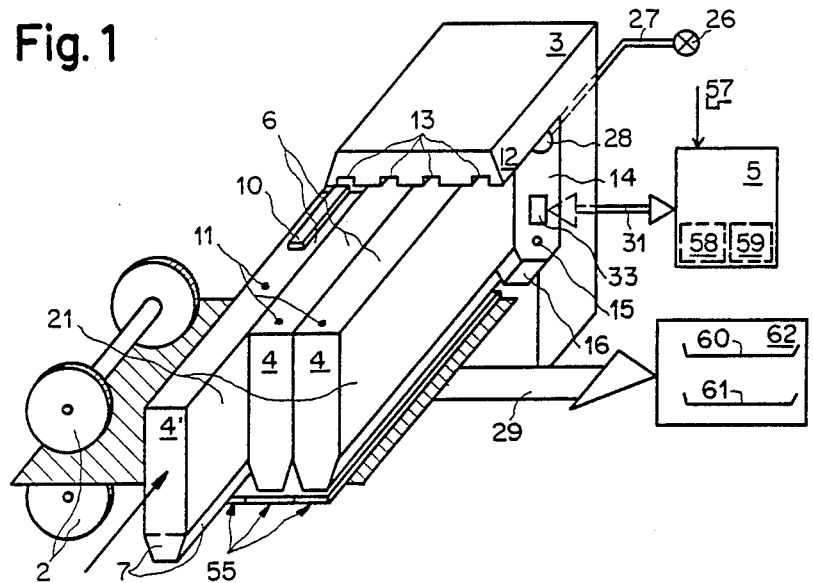
FIG. 1 shows a device for recognizing authentic documents, comprising a reading head including a plurality of modules of one and the same type, in accordance with an illustrative embodiment of the present invention.

In FIG. 1, a document 1 is conveyed below an optical reading head by means of a conveying device 2 represented symbolically by a pair of rollers. The reading head comprises a connection plate 3 and at least two modules 4 of same type plugging into the connection plate 3. The modules 4 are parallel to each other and optically scan the document 1 being conveyed under the reading head. One of the modules 4 bearings the reference 4' in FIG. 1 and is shown being inserted into a plug-in location of the connection plate 3. Typically, the connection plate 3 has four plug-in locations. The number of plugged-in modules 4 used to recognize the authenticity of the document 1 is predetermined and depends on the type of the document 1 to be recognized. An electronic evaluating device 5 checks whether each of the required modules 4 is plugged in. Two to four modules 4 are used. Preferably, each module 4 scans the document 1 within a spectral range predetermined by the coloration of the document 1, and transmits its measured values to the evaluating device 5. Depending on the set task, individual plugged-in modules 4 can be skipped over in predetermined evaluating steps. Each module 4 is constructed in the same manner of all have housings 6 of the same type.

Figure 2:
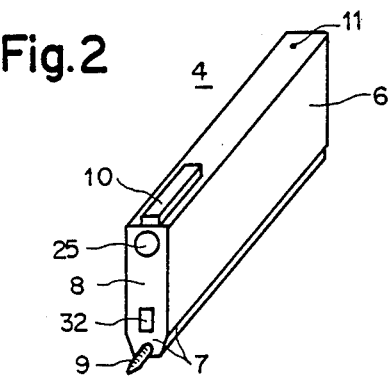
FIG. 2 shows a side view of a module.

In an embodiment according to FIG. 2 the housing 6 has a prismatically profiled cross-section. Housing 6 tapers in a lower part 7 which faces the document 1, as can be seen by viewing a rear wall 8. A conical mandril 9, extending parallel to the longitudinal axis of housing 6, projects for example from the rear wall 8 in the lower half. A rail 10 extends parallel to the longitudinal axis of housing 6 on an upper side 11 of the housing 6 from the rear wall 8 to approximately one half of the length of the module 4.

The plug-in locations of the connecting plate 3 are covered at the top by a common projecting arm 12. In an underside of arm 12 facing one of the plug-in locations, grooves 13 for the rails 10 are formed and lead to plug-in locations. Every plug-in location is limited in depth by a plug-in plate 14 with a guiding hole 15 for the mandril 9. Every plug-in location is closed at the bottom by means of a U-shaped trough 16 which opens up at every plug-in location of the connecting plate 3 against arm 12 and is adapted to the lower part 7 of the housing 6. Arm 12, the plug-in plate 14 and the trough 16 surround the housing 6 of the module 4 near the back wall 8 in such manner that the module 4 plugged into the connecting plate 3 assumes one single possible, predetermined position.

The tapered lower part (FIGS. 1 and 3) of module 4 is partially closed by a reading window 17 on its narrow side which faces the document 1. It determines the optically sensitive length of the module 4 which results essentially from the length of the module 4 less a partial segment of housing 6 covered by the trough 16.

A plurality of photosensors 18 installed in a line for optically scanning the document 1 is provided on the entire optically sensitive length within housing 6 (FIG. 3), directly behind the reading window 17. Each photosensor has an optical axis 19. The axes 19 are perpendicular to the plane of the document 1 and define a detector plane 19'. Optical light guides 20 which arrive in housing 6 from the top 11 and closely adhere on the inside to the longitudinal walls 21 of the housing 6 transmit the light symmetrically to the detector plane 19' and up to the reading window 17. The optical light guides 20 are bent at an angle of approximately 30° towards the detector plane 19'in the lower part 7 so that light emerging from said optical light guides in even distribution over the entire reading window 17, as indicated by arrows 22, may intersect on document 1 in a planned intersection line between the detector plane 19' and the document 1. An electronic circuit 23 is installed between the two planes with the optical light guides 20 and directly behind the line of the photosensors 18.

In an embodiment of module 4 the optical light guides 20 are gathered together into a fiber bundle 24 in a channel between the circuit 23 and the top 11 of the housing 6. The fiber bundle 24 is guided in an optical connector 25 to the back wall 8 (FIG. 2). Light coming from a light source 26 (FIG. 1) behind the connection plate 3 reaches, preferably through light conductor 27, a mating unit 28 mounted in the plug-in plate 14 and constituting a plug-in coupling 25, 28 together with a connector 25. An illumination device composed of parts 20 and 24 to 28 preferably does not release the heat produced by the light source 26 in the modules 4 but at an appropriate location of the device suited for that purpose and therefore does not influence the performance characteristics of the photosensors 18 (FIG. 3) and of the electronic circuit 23.

Instead of fibers, other types of optical light guides 20 can also be used. For example, plate-shaped optical light guides 20 which are integrated into the two longitudinal walls 21 could also be used. Glass and advantageously also synthetic materials such as polycarbonate or polymethyl methacrilate can be used as the material of the optical light guides 20.

The light led through module 4 by the optical light guides 20 illuminates the document 1 beneath each module 4 evenly over a 3 mm to 5 mm wide strip of said document 1 transversely to a conveying direction indicated by a directional indicator 29. Reflected light 30 reaches the photosensors 18 which convert the entering light 30 into electric analog signals of corresponding intensity.

Figure 4:
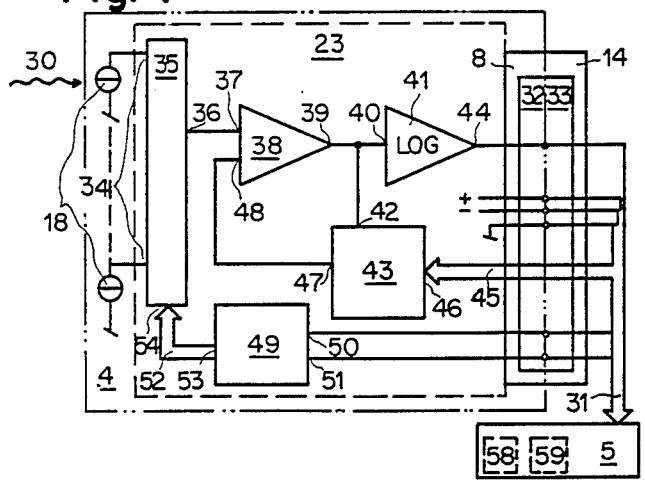
FIG. 4 shows the electronic circuit of a module.

Each module 4 (FIG. 4) is connected by means of an as small as possible quantity of electric conductors 31 to the evaluating device 5, whereby several of the electric conductors 31 of the electronic circuit 23 supply energy and a reference voltage to the electronic circuit 23 and to the photosensors 18. The electronic circuit 23 amplifies the analog signals of the photosensors ls and transmits these analog signals in a predetermined sequence to the evaluating device 5. The electric conductors 31 are connected to the evaluating device 5 and can be disconnected from same, whereby each module 4 has a plug 32 on the back wall 8 and the plug-in plate 14 has a plug-in receptacle 33 at each plug-in location, constituting a mating plug-in connection 32, 33. The elements 32 and 33 constitute first and second mating elements of the connection 32, 33.

In a first embodiment of the circuit 23 each photosensor 18 is connected directly to one analog input 34 of a multiplexer 35. The number of photosensors 18 is preferably a whole number and is a multiple corresponding to the division of the multiplexer 35, e.g. of 16. An analog output 36 of the multiplexer 35 leads to an amplification input 37 of an amplifier 38. A connection leads from an amplification output 39 to an input 40 of logarithmic amplifier 41 as well as to a signal input 42 of a control circuit 43. An output 44 of the logarithmic amplifier 41 leads to a pin of the plug 32 in the back wall 8. A data bus 45 conducts digital control data from the evaluating device 5 via mating plug-in connection 32, 33 to the control inputs 46 of the control circuit 43, one signal output 47 of which being connected to a regulating input 48 of the amplifier 38. Two of the electric conductors 31 lead from the evaluating device 5 to a address generator 49, whereby the first conductor is connected to a reset input 50 and the second one to a timing input 51 of the address generator 49. Address connections 52 connect address outputs 53 of the address generator 49 to address inputs 54 of the multiplexer 35.

Upon insertion into the plug-in location, the module 4 (FIGS. 1 and 2) is first guided by means of the rail 10 and the groove 13. As soon as the trough 16 receives the lower part 7 of the module 4 as it is inserted, the housing 6 is guided with such precision against the plug-in plate 14 that the tip of the conical mandrel 9 can enter the guiding hole 15 and so that the connector 25 is lined up precisely for insertion with the mating unit 28 and so that the plug 32 mates with the plug-in receptacle 33. Both plug-in connectors 25, 28 and 32, 33 are plugged in when the module 4 has reached a predetermined end position in the plug-in area. An additional lock, not shown here, retains the module advantageously at its location in the connecting plate 3 predetermined by guiding means 7, 16 or 9, 15 or 10, 13 so that it cannot shift.

The photosensors 18 (FIGS. 1 and 3) have wide spectral sensitivity and convert the reflected light 30 of the entire visible and from the close infrared range into analog electric signals. Since the documents 1 are generally imprinted with different colors, means are provided to restrict the spectral sensitivity of module 4 to a narrow range of the spectrum in order to be able to recognize the colors of the document 1 by means of the device.

If the illumination device is equipped with a light source 26 (FIGS. 1 and 3)with white light, e.g. a halogen lamp, different optical filters 55 which are placed in front of each reading window 17 or which are installed on the connection plate 3 independently of module 4 narrow the spectral sensitivity of module 4. The white light emitted by the optical light guides 20 on the way to document 1 as well as the reflected light 30 must go through the filter 55. With this arrangement scattered light from another spectral range which could otherwise enter the reading window 17 and could falsify the analog signals of the photosensors is advantageously filtered out In another embodiment of the illumination device, the filter 55 can be placed between the connection element 28 and the light source 26 for example, or each plug-in location could be provided with an independent, one-color light source 26 with a predetermined narrow spectral range, such as luminous diodes for example.

The filters 55 or light sources 26 serving as means to determine the spectral sensitivity of the module 4 are mounted independently of the modules 4 and outside the latter. The housings 6 are of identical configuration. For this reason each of these modules 4 in particular can be plugged into each of the plug-in locations and be operated, and the interchangeability of the module 4 is ensured. This is especially advantageous for maintenance work on the device for the recognition of the authenticity of documents 1, for shelf life and economical manufacture of the module 4.

The means for the determination of spectral sensitivity are easy to replace. The parameters of the filters 55 such as transmission handwidth and wavelength of greatest transmission are functions of the task to be carried out and can be adapted optimally to a set of documents 1 to be recognized.

Figure 3:
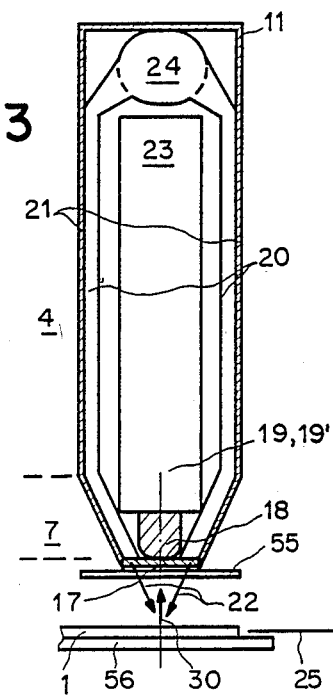
FIG. 3 shows a module in cross-section.

The document 1 is transported by the conveying device 2 over a plate 56 (FIG. 3 . The plate 56 has a predetermined reflectivity in the area of the module 4 to calibrate the sensitivity of the individual photosensors 18. This calibration is effected by means of measurement of the intensity of the reflected light of the light source 26 by means of the photosensors 18, for example shortly before the document 1 is inserted under the first module 4 of the reading head.

The evaluating device 5 (FIG. 1) controls the transport of the conveying device 2 in conjunction with the document 1 step by step or continuously beneath the reading head along the directional indicator 29. A step signal 57 produced by the conveying device 2 and corresponding to the advance of document 1 triggers a reset signal in the evaluating device 5 and a sequence of timing signals which reach the address generator 49 via the electric conductors 31 (FIG. 4) in each module 4.

The modules 4 scan the document 1 which is conveyed beneath them by means of the photosensors 18 line by line (FIG. 1) in different predetermined spectral ranges, transversely to the direction of movement and transmit the measured values to the evaluating device 5. The synchronization of the evaluating device 5 with the conveying device 2 by means of the step signal 57 makes it possible to clearly attribute a position on document 1 to each of the line-shaped segments of document 1 which is read by means of a module 4.

In one embodiment, the address generator 49 contains a counter which is not shown here. The reset signal at the reset input 50 resets the counter to zero. The counter then registers the sequence of timing signals at the timing input 51 and transmits the state of the counter via the address circuit 53 to the multiplexer 35 in form of a digital signal. The digital signal at the address inputs 54 determines which one of the photosensors 18 is switched to the amplifier input 37 by means of the multiplexer 35.

A control value is attributed to each one of the photosensors 18 of the reading head. The evaluating device 5 calls up the control value which is attributed to the photosensor 18 connected at the moment to the amplifier 38 from a memory (not shown here) of the evaluating device 5 and transmits it via the data bus 45 to the control inputs 46. The control circuit 43 regulates the amplification in the feedback path 39, 42, 43, 47, 48 and thereby the amplification of the amplifier 38 by means of the control value. This compensates for th different sensitivities of the photosensors 18 of each of the modules 4. In an embodiment capable of high reading speed, only one single control value is utilized for an entire module 4 and it compensates only the varying sensitivity of the photosensors 18 of a module 4 in the different spectral ranges. For example, such a device is typically capable of checking and sorting five bank notes per second.

New control values are generated at each calibration of the sensitivity of the photosensors 18 for instance, and are stored in the evaluating device 5.

An analog signal which is independent of the sensitivity of the photosensors 18 is logarithmized, in the logarithmic amplifier 41 for example, and is transmitted to the evaluating device 5. In the evaluating device 5 the analog signal is digitized and the result is placed in a location of a reading memory 58 assigned to the photosensor 18. When the document 1 being tested has been conveyed under the reading head by means of the conveying device 2 the reading memory 58 has received a digital image of the document 1 from the spectral ranges predetermined by the means mentioned earlier. In a reference memory 59 model values for the different spectral ranges are stored for all the sets of documents 1 to be recognized. All documents being tested are compared with the corresponding model values and a correlation value is calculated in a known manner for each set of the model values.

The maximum correlation value, which desirably should have a minimal value such as 0.6 for instance, determines the stored document model to which the unknown, document 1, corresponds. If the minimum value is not attained the evaluating device 5 (FIG. 1) rejects the document 1 as non-authentic or as not being part of the acceptable documents and guides the rejected document 1 into a return receptacle 60 by means of an element (not shown) of the conveying device 2. The receptacle 60 forms part of a sorting device 62 which comprises a return receptacle 60 and a check-out device 61. Accepted documents 1 are conveyed into the check-out device 61 and at the same time a characteristic value of the accepted document 1 is put out at an output (not shown here) of the evaluating device 5.

The sets of the model values can be produced by the evaluating device 5 for example, by reading different documents 1 into the device in all practically possible orientations. A continuous adaptation of the appropriate model values in the reference memory 59 by producing a weighted median value based on the old model values and the measured values stored in reading memory 58 which represent the copies of accepted documents 1 advantageously corrects the slight variations between different printing series of a document 1 and variations which result when copies have been worn out and aged to different degrees, e.g. in bank notes.

Other embodiments of this circuit 23 (FIG. 4) can be easily derived by a person skilled in the art. In a second embodiment of the circuit 23 for example, an analog-to-digital converter (not shown here) can be inserted in common for the modules 4 or individually for each module 4 between output 44 and the plug 32. The analog-digital converter produces a digital signal corresponding to the analog signal at output 44, e.g. in form of an 8-bit word. The digital signals are transmitted via an additional signal bus (not shown here) to the evaluating device 5 through the plug-in connection 32, 33. As compared with the first embodiment where analog signals are transmitted, the more interference-free character of a transmission of digital signals in the electric conductors 31 to the evaluating device 5 is an advantage The type of photosensors 18 used and the distance between their optical axes 19 determine the resolution of the reading head. In an embodiment with PIN diodes used as the photosensors 18 ( type BPW 13C) and with a vertical distance between the photosensors 18 and the document 1 of about 5 mm, each photosensor 18 detects the light 30 reflected from a square surface, a so-called pixel, with approximately 3.1 mm sides. Thirty-two of these photosensors 18 suffice for an optically sensitive length of 100 mm of the module 4. The digital components of the HCMOS type, used for the address generator 49 for example, are advantageous for processing speed. In an embodiment of the amplifier 38 and 41, the circuit LF411 of National Semiconductor is used for the linear amplifier 38 and the circuit LOG 100 of Burr Brown is used for the logarithmic amplifier 41. An LF 13006 (digital gain set) of National Semiconductor is suitable for the control circuit 43 and an MUX 16 (analog-multiplexer) of Precision Monolitics Inc. is suitable for the multiplexer 35.

In an embodiment of the reading head 3, 4 (FIG. 1) with four modules 4, the mono-chromatic light sources 26 or the optical filters 55 narrow the spectral sensitivity of each module 4 to, an infrared light wavelength in the range of approximately 1.2 $\mu$M to 0.9 $\mu$Mor to red, green or blue light.

In another embodiment it is also possible to advantageously use for each module 4 a combination of a single-color light source 26 and of a filter 55 that is transparent only to its light, said filter 55 being located between the module 4 and the document 1 to be read for the screening of scattered light.

Finally, the above-described embodiments of the invention are intended to be illustrative only. Numerous alternative embodiments may be devised without departing from the spirit and scope of the following claims.

We claim:

1. A device for authenticating documents comprising
    a reading head for optically scanning a document, said reading head including at least two substantially identical modules each of which is provided with a line of photosensors, and means for determining the spectral sensitivity of said modules,
    evaluation means for correlating signals provided by, said photosensors when said photosensors are illuminated with light from a light source with pre-stored values,
    conveying means for providing relative movement between said reading head and said documents, and
    sorting means controlled by said evaluation means in accordance with a correlation value.

2. The device of claim 1 wherein each of said modules is equipped with optical light guides arranged on oppositely disposed sides of the module and symmetrically to said line of photosensors for the illumination of said document.

3. The device of one of claims 1 or 2 wherein each module is connected to said reading head, by means of first and second electrical mating elements associated with the module and the reading head, respectively, and by first and second optical mating elements, associated with the module and the reading head, respectively, said second electrical mating element being connected to said evaluation means by a set of electrical conductors.

4. The device of one of claims 1 or 2,
    wherein said reading head further comprises a connecting plate with plug-in locations for said modules;
    wherein said modules are provided with guide means for removably plugging in to said reading head at said plug-in locations,
    wherein each of said modules is connected to said reading head by means of first and second electrical mating elements associated with the module and the reading head, respectively, and by means of first and second optical mating elements, associated with the module and the reading head respectively, said electrical and optical mating elements mating automatically when a module is pushed into one of said plug-in locations using said guide means.

5. The device of claims 1 or 2 wherein each module is provided with a multiplexer connected to the photosensors in the module to reduce the number of conductors connecting the module to said evaluation means.

6. The device of claim 5 wherein each module comprises at least one logarithmic amplifier with adjustable logarithmic amplification, the amplification factor of said logarithmic amplifier being adjustable by said evaluation means to compensate varying sensitivities of different modules.

7. The device of claim 5 wherein each module contains at least one analog-to-digital converter controlled by said evaluation means.

8. The device of claim 1 wherein said spectral sensitivity determination means comprises an optical filter located between at least one of said modules and said document, whereby light transmitted to and reflected from said document passes through said filter.

9. The device of claim 8 wherein said optical filter is replaceable.

10. The device of claim 1 wherein said photosensors of each module are illuminated by a light source having a spectral range predetermined for each of said modules.

11. The device of claim 1 wherein said evaluating means and said conveying means are synchronized by means of a signal applied to said evaluating means so that a document can be transported underneath said modules by said conveying means and read line-by-line by said modules.

* * * * *